US012603549B2

(12) United States Patent
Shah et al.

(10) Patent No.: US 12,603,549 B2
(45) Date of Patent: Apr. 14, 2026

(54) POWER GENERATION SYSTEM WITH SYNCHRONOUS CONDENSER

(71) Applicant: VOLTAGRID LLC, Houston, TX (US)

(72) Inventors: Achal Sandipbhai Shah, Houston, TX (US); Albert Reed Philen, Jr., Houston, TX (US); Leslie Michael Wise, Houston, TX (US); Cameron Gandy, Houston, TX (US); Syed Tilal, Houston, TX (US)

(73) Assignee: VOLTAGRID LLC, Houston, TX (US)

( * ) Notice: Subject to any disclaimer, the term of this patent is extended or adjusted under 35 U.S.C. 154(b) by 0 days.

(21) Appl. No.: 19/272,546

(22) Filed: Jul. 17, 2025

(65) Prior Publication Data

US 2026/0058525 A1    Feb. 26, 2026

Related U.S. Application Data

(63) Continuation of application No. 19/244,542, filed on Jun. 20, 2025.

(Continued)

(51) Int. Cl.
*H02K 7/18* (2006.01)
*H02K 7/02* (2006.01)

(52) U.S. Cl.
CPC ............. *H02K 7/1823* (2013.01); *H02K 7/02* (2013.01)

(58) Field of Classification Search
CPC ............................... H02K 7/1823; H02K 7/02
See application file for complete search history.

(56) References Cited

U.S. PATENT DOCUMENTS

| 7,474,016 B2 | 1/2009 | Wang et al. |
| 9,733,657 B2 | 8/2017 | Ye et al. |

(Continued)

FOREIGN PATENT DOCUMENTS

| CN | 105958488 | 9/2013 |
| JP | 2017038479 | 2/2017 |

OTHER PUBLICATIONS

International Searching Authority; PCT/US2025/041652, Sep. 29, 2025, Invitation to Pay Additional Fees and, Where Applicable, Protest Fee.

(Continued)

*Primary Examiner* — Viet P Nguyen
(74) *Attorney, Agent, or Firm* — Morgan, Lewis & Bockius LLP

(57) ABSTRACT

A microgrid system includes a common bus; a generator electrically connected to the common bus, the generator comprising a prime mover; a generator stator; and a generator rotor coupled to the prime mover. The generator rotor and the prime mover have a combined generator rotational moment of inertia and the prime mover is configured to rotate the generator rotor relative to the generator stator at a system angular velocity to generate electricity. The synchronous condenser includes a synchronous condenser rotor with a synchronous condenser rotational moment of inertia. The synchronous condenser rotor is configured to rotate at the system angular velocity in response to rotation of the generator rotor. The microgrid system has a combined system rotational moment of inertia including the generator rotational moment of inertia and the synchronous condenser rotational moment of inertia, wherein the system rotational moment of inertia resists deviation of the system angular velocity.

28 Claims, 7 Drawing Sheets

Related U.S. Application Data

(60) Provisional application No. 63/797,717, filed on Apr. 30, 2025, provisional application No. 63/685,118, filed on Aug. 20, 2024.

(56) References Cited

U.S. PATENT DOCUMENTS

| | | | |
|---|---|---|---|
| 10,431,984 B2 | 10/2019 | Mouni et al. | |
| 10,439,429 B2 | 10/2019 | Ristau | |
| 11,188,045 B2 | 11/2021 | Reddy | |
| 11,515,708 B2 | 11/2022 | Cummings | |
| 11,843,250 B2 | 12/2023 | Pedersen et al. | |
| 11,990,754 B2 | 5/2024 | Kozaki | |
| 2015/0364920 A1 | 12/2015 | Konopinski et al. | |
| 2023/0291339 A1* | 9/2023 | Deakin ................... | H02J 3/30 |

OTHER PUBLICATIONS

Annell, Ander, ABB Synchronous Condenser package; Mar. 28, 2023.

Nybeck, Charles N. et al., Characterizaton of ultracapacitors for Transient Load Applications, IEEE Transactions On Plasma Science, vol. 47, No. 5, May 2019; ; pp. 2493-2499.

AI Data Center Load Smoothing with Megapack, Application note, Version 1.0, Feb. 21, 2025.

SkelGrid 2.0, Supercapacitor energy storage systems for high-power applications; Undated, 11 pages.

\* cited by examiner

POWER GENERATION SYSTEM WITH SYNCHRONOUS CONDENSER

REFERENCE TO RELATED APPLICATIONS

This application is a continuation of U.S. Ser. No. 19/244,542 filed on Jun. 20, 2025, which claims priority to, and the benefit of, both U.S. Provisional Application Ser. No. 63/797,717, filed on Apr. 30, 2025, and U.S. Provisional Application Ser. No. 63/685,118, filed on Aug. 20, 2024, the entire disclosures of which are hereby incorporated by reference.

TECHNICAL FIELD

This application is directed to a power generation system, and more particularly, microgrids for use with transient loads.

BACKGROUND

A microgrid is a self-sufficient energy system that serves a discrete geographic footprint. The microgrid is made up of a decentralized group of electricity sources and loads that normally operate connected to, and synchronous with, the traditional wide area synchronous grid (macrogrid). These electricity sources can also disconnect to "island mode," where the microgrid operates independently of the macrogrid, and function autonomously as physical or economic conditions dictate. In this way, a microgrid can effectively integrate various sources of distributed generation, especially renewable energy sources, and can supply emergency power, changing between island and connected modes. Microgrids are also capable of dispatching power to the macrogrid.

Microgrids are often utilized as localized energy sources, where power transmission and distribution from a major centralized energy source is impractical to implement and/or cost prohibitive. Implementing new power transmission lines can take years. Time is critical in these instances, so a multi-year long delay in setting up utilities can shut down a project.

In some applications, such as data center operations, an energy source may experience transient or otherwise varying load profiles. Load profiles vary from client to client. In some applications, load profiles may include rapid changes to increase and/or decrease load as single events or repeating events. For example, a load may change from 0% to 100% and back to 0% over intervals spanning milliseconds to hundreds of seconds. In other examples, a load may shift in amplitude from 30% to 50% base load with excursions to 80% to 100%. In some applications, the load profile may be clustered with periods of steady state demand between transient clusters. In some examples, a load may change from 50% to 90% over intervals spanning milliseconds to hundreds of seconds, drop back to 50%, and then repeat the cycle over again.

Variations in load frequency, amplitude, and/or periodicity can potentially cause undesired electrical and/or mechanical harmonic events for certain conventional energy sources. Unanticipated harmonic events may result in premature failures of electrical or mechanical systems. System failures negatively impact operational reliability, maintenance, and operating expenses.

For example, variations in load can cause a deviation in the frequency of the microgrid. When the amount of electrical power consumed by the load changes, the mechanical power input from the generator must change to match the electrical power consumed by the load. However, changes in mechanical power (increased/decreased fuel consumption) tend to change at a slower rate than changes in demand for electrical power. This causes temporary differences between the mechanical power into, and the electrical power out of, the generators in a power system. When the load rapidly increases, the rotating machines slow down and expend kinetic energy to make up for the lack of sufficient mechanical input power. When the load rapidly decreases, the rotating machines speed up, storing more rotational energy while the mechanical input power decreases. This is the mechanism by which load changes cause sags and swells in system frequency.

Previously, battery backups have been used to address the deviations in system frequency. While battery backups rely on fast controls and switching in inverters and other power electronics to respond to instantaneous load blocks before frequency has decayed beyond the customer tolerances, this solution is highly inefficient. Battery backups require large amounts of energy to be stored. Battery backups can also contain hazardous materials and may rely on inverters. Batteries also require a 1:1 peak load matching, meaning a 50 MW load would require a 50 MW battery capacity.

In some applications, it may be desired to power a load with transient or varying load profiles, such as a data center operation, using a microgrid. Therefore, what is needed is a microgrid, or a method of use thereof, that addresses one or more of the foregoing issues.

SUMMARY

In one embodiment, a microgrid system may comprise a common bus; a generator electrically connected to the common bus, the generator comprising a prime mover; a generator stator; and a generator rotor coupled to the prime mover, wherein the generator rotor and the prime mover have a combined generator rotational moment of inertia and the prime mover is configured to rotate the generator rotor relative to the generator stator at a system angular velocity to generate electricity; and a synchronous condenser electrically connected to the common bus, the synchronous condenser comprising a synchronous condenser rotor with a synchronous condenser rotational moment of inertia, wherein the synchronous condenser rotor is configured to rotate at the system angular velocity in response to rotation of the generator rotor, wherein the microgrid system has a combined system rotational moment of inertia including the generator rotational moment of inertia and the synchronous condenser rotational moment of inertia, wherein the system rotational moment of inertia resists deviation of the system angular velocity.

In another embodiment, a microgrid system may comprise a common bus; a generator electrically connected to the common bus, the generator comprising a prime mover; a generator stator; and a generator rotor coupled to the prime mover, wherein the generator rotor and the prime mover have a combined generator rotational moment of inertia and the prime mover is configured to rotate the generator rotor relative to the generator stator to generate electricity at a system frequency; and a synchronous condenser electrically connected to the common bus, the synchronous condenser comprising a synchronous condenser rotor with a synchronous condenser rotational moment of inertia, wherein the synchronous condenser rotor is configured to rotate in response to electricity generated by the generator at the system frequency, wherein the microgrid system has a combined system rotational moment of inertia including the generator rotational moment of inertia and the synchronous condenser rotational moment of inertia, wherein the system rotational moment of inertia resists deviation of the system frequency.

In another embodiment, a method for providing electric power may comprise the steps of receiving a first power demand from a load at a microgrid; distributing power to the load from the microgrid, the microgrid comprising electrically coupling a common bus to the generator, wherein the generator generates a rotational energy at a system rotational frequency; electrically coupling the common bus to a synchronous condenser, wherein the synchronous condenser operates at the system rotational frequency in response to the generator; and storing rotational energy with the synchronous condenser; receiving a second power demand from the load, wherein the second power demand is greater than the first power demand; deploying the rotational energy of the generator and the stored rotational energy of the synchronous condenser to distribute power to the load from the microgrid to limit a deviation of the system frequency in response to the second power demand.

BRIEF DESCRIPTION OF THE DRAWINGS

The accompanying drawings, which are included to provide further understanding and are incorporated in and constitute a part of this specification, illustrates disclosed embodiments and together with the description explains the principles of the disclosed embodiments.

Figure 1:
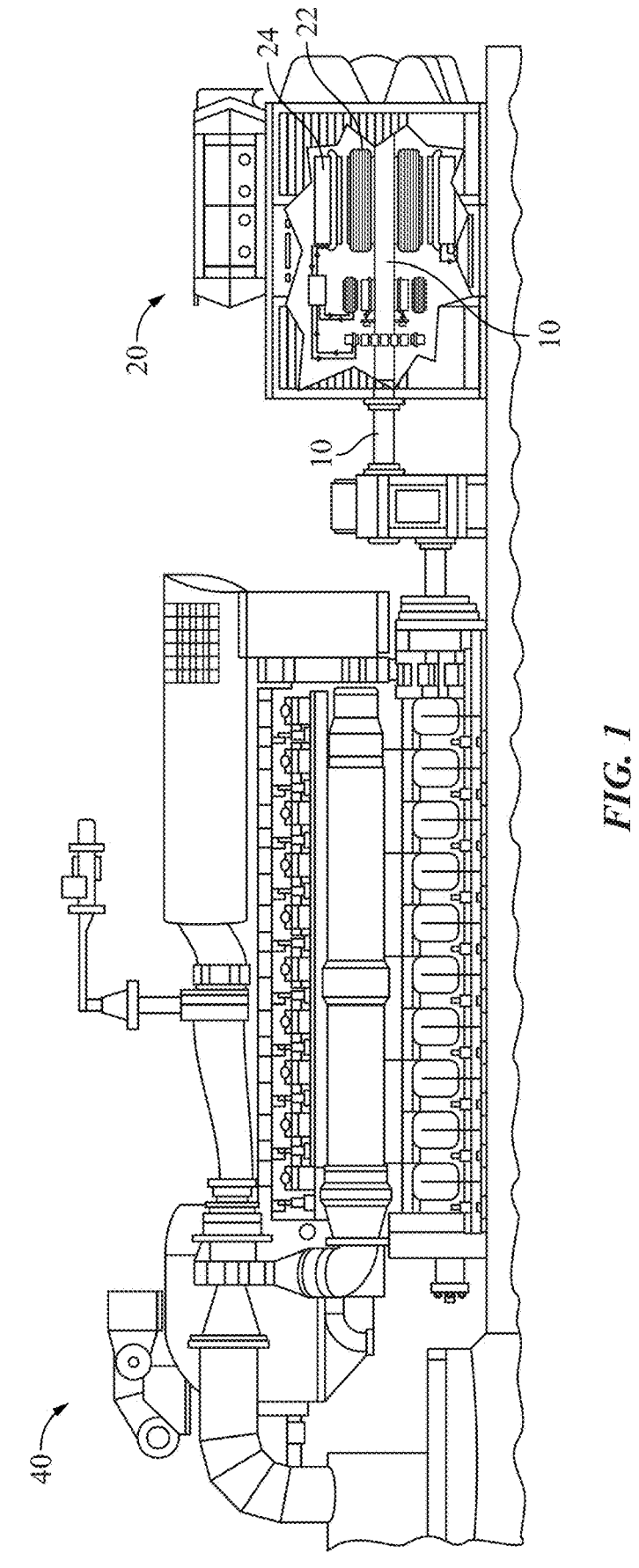
FIG. 1 is an exemplary embodiment of a generator, in accordance with embodiments of the present disclosure.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

In the following detailed description, numerous specific details are set forth to provide a full understanding of the subject technology. The subject technology may be practiced without some of these specific details. In other instances, well-known structures and techniques have not been shown in detail so as not to obscure the subject technology.

Further, while the present description sets forth specific details of various embodiments, it will be appreciated that the description is illustrative only and should not be construed in any way as limiting. Additionally, it is contemplated that although particular embodiments of the present disclosure may be disclosed or shown in the context of a microgrid, such embodiments can be used in other power generation systems. Furthermore, various applications of such embodiments and modifications thereto, which may occur to those who are skilled in the art, are also encompassed by the general concepts described herein.

As described above, variations in load frequency, amplitude, and/or periodicity can potentially cause premature failure of electrical and/or mechanical systems associated with an energy source, impacting operational reliability, maintenance, and operating expenses. Further, utility power providers may prefer steady state loads with gradual changes in overall load magnitudes over transient load profiles since planning for peak load with transient demands can result in lower power utilization, decreased system efficiency, and increased operating cost.

In certain conventional applications, energy storage systems (e.g. battery systems) have been utilized with utility power to dampen the effects of transient load profiles. However, certain conventional energy storage systems may not react fast enough to dampen harmonic events caused by the varying load profile. Further, the additional capital cost of energy storage systems and peak demand charges may increase operation costs.

As described herein, electricity sources such as generators may not be able to adjust their electrical output in response to transient load profiles, requiring generators to slow down and expend kinetic energy to meet an increased demand. Referring to FIG. 1, an exemplary embodiment of a generator 110, in accordance with embodiments of the present disclosure, is shown. In the depicted example, the generator 110 includes a prime mover 40 which rotates an alternator 20 to generate electricity. In some embodiments, the prime mover 40 and alternator 20 are mechanically connected by a shaft 10 or other suitable coupling. In some applications, the prime mover 40 and the alternator 20 may be directly coupled without a shaft or other intermediate structure. During operation, the prime mover 40 rotates a rotor 22 of the alternator 20 relative to the stator 24, generating a magnetic field, inducing current in the stator 24 and producing electricity. As described herein, the prime mover 40 can be any suitable machine that generates mechanical energy, such as a reciprocating engine or a turbine engine. Optionally, the generators 110 can be fueled by hydrogen, diesel, and/or other combustible gases. Embodiments of generators are described in U.S. application Ser. No. 17/575, 194, titled "Mobile hybrid microgrid", filed Jan. 13, 2022, incorporated herein.

During operation, rotating components of the prime mover 40 and the rotor 22 of the alternator 20 rotate to generate electricity at a desired frequency. The frequency f of the electricity is related to the rotational speed RPM of the prime mover 40 and the rotor 22 by the following equation:

$$f = RPM \cdot \frac{n_p}{120} = \frac{60}{2\pi} \cdot \omega \cdot \frac{n_p}{120} = \frac{n_p}{4\pi} \cdot \omega$$

In this equation, np is the number of poles for the alternator 20 (or other rotating machine) and ω is the angular velocity of the prime mover 40 and the rotor 22. For example, for a 4 pole machine or generator at an electrical frequency of 60 Hz, the angular velocity is approximately 188.7 Rad/s.

As described herein, the rate of change of angular velocity with respect to time ($\Delta\omega/\Delta t$), and therefore the range of change of frequency with respect to time ($\Delta f/\Delta t$), is related the difference in available mechanical power ($P_{mech}$) and the electrical power demand ($P_{elec}$) for a given time period. As shown in the equation below, the transient behavior of the generator is related to the rotational moment of inertia J. Here, the rotating components of the prime mover 40 and the rotor 22 of the alternator 20 have a combined generator rotational moment of inertia. This relationship is shown in the equation below:

$$\frac{\Delta\omega}{\Delta t} = \frac{P_{mech} - P_{elec} - P_{loss}}{J \cdot \omega}$$

The rotational moment of inertia J for each rotational component is related to the mass m of each rotational object and the square of the radius r of the object:

$$J = \frac{1}{2} m \cdot r^2$$

As shown by the equation below, the amount of rotational energy stored within a rotating component, such as the generator, is related to the square of the electrical frequency, and is proportional to the moment of inertia of the rotating components. The relationship between the stored rotational energy, the moment of inertia, and the angular velocity of a rotating component is shown below:

$$E = \frac{1}{2} J \cdot \omega^2$$

The total amount of rotational energy stored in a system $E_{tot}$ (e.g. with multiple generators or other components such as synchronous condensers), can be calculated by summing the rotational moment of inertia for each of the rotational components in the system $J_{tot}$:

$$E_{TOT} = \frac{1}{2} J_{TOT} \cdot \omega^2$$

Based on the relationships described above, the transient behavior of a power system is related to the total rotational moment of inertia of the rotating components within the power system. As described herein, a system with a relatively low rotational moment of inertia can affect the transient frequency response of the microgrid in response to a changing load profile.

Figures 2, 3A:
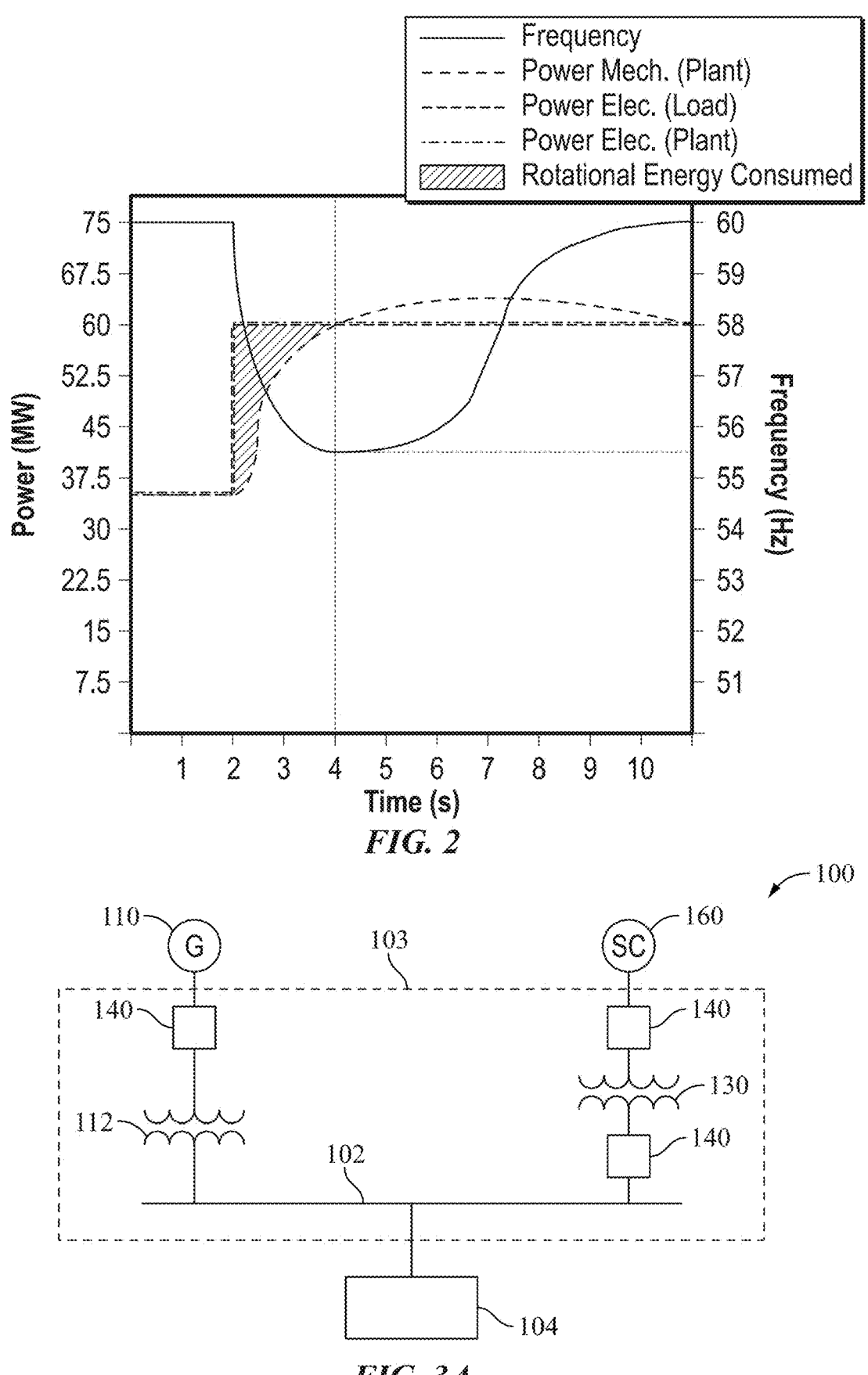
FIG. 2 is a graph depicting the frequency responses of a microgrid without a synchronous condenser.
FIG. 3A is an electrical line diagram of a power generation system with a synchronous condenser, in accordance with embodiments of the present disclosure.

FIG. 2 shows the frequency response of a microgrid system utilizing a generator without the use of a synchronous condenser. The Power Elec (Load) line shows the power requirement of a load. In this example, a load initially requires about 35 MW of power, but then requires a sudden increase to 60 MW of power. As illustrated, the mechanical power (plant) lags behind the initial change in demand from the load, causing rotational energy of the microgrid to be consumed, and the frequency to sag or decrease.

In the example shown in FIG. 2, the generators of the microgrid can take approximately 2 seconds to arrest the frequency decay in response to the increase in load (load block). In some applications, the power response of the generators or microgrid ($P_{mech}$) can be approximated as a linear increase over time t in response to the change in power demand ($P_{elec} - P_{init}$) as shown by the equation below:

$$P_{mech} = P_{init} + \frac{1}{2} \cdot (P_{elec} - P_{init}) t$$

Assuming a 2 second transient period to arrest the frequency decay, the deviation in angular velocity $\omega_{dev}$ can be related to the change in power demand ($P_{elec} - P_{init}$) by integrating the "swing" or rate of change of the angular frequency $\omega_{dev}$ over time with respect to the change in power demand ($P_{elec} - P_{init}$), which is related to the total rotational moment of inertia J:

$$\omega_{dev} = \pi \cdot f_{dev} = \int_0^2 \frac{P_{init} + \frac{1}{2} \cdot (P_{elec} - P_{init}) t - P_{elec} - P_{loss}}{J \cdot \omega}$$

In some applications, by simplifying the above equation (e.g. ignoring losses), the deviation in frequency $f_{der}$ can be related to the change in power demand ($P_{elec} - P_{init}$), the total rotational moment of inertia J, and the angular velocity ω of the rotating components:

$$f_{dev} = \frac{1}{\pi \cdot J \cdot \omega} \cdot (P_{init} - P_{elec})$$

As illustrated in FIG. 2, the relatively low rotational moment of inertia J of the microgrid allows the frequency to deviate significantly from the target of 60 Hz. In response to the load block, the system energy decreases by approximately 15% and the frequency sags to a low of approximately 55.5 Hz (approximately a 9.2% reduction). Further the system deviates from the target frequency for approximately 7 to 8 seconds after the change in load profile, which may result in premature failures of electrical or mechanical systems.

In accordance with embodiments of the present disclosure, a microgrid can include a synchronous condenser to increase the total rotational moment inertia of the system to minimize or resist frequency deviations, allowing for reliable operation of the microgrid and any attached loads. As illustrated to FIG. 3A, the electrical line diagram of a microgrid system 100, in accordance with embodiments of the present disclosures, is shown. In the depicted example, the microgrid system 100 provides power to a load 104. In some embodiments, the load 104 can have a steady state load profile, a transient, varying, or dynamic load profile, or a load profile that includes periods of transient demand and periods of steady state demand. For example, the load 104 can include, but is not limited to a data center, an oil and gas pressure pumping operation, etc.

In the depicted example, the microgrid system 100 can receive power from one or more power sources (e.g. distributed energy resources or DER), combine power from the power sources, and output or distribute the power to one or more loads 104. Advantageously, the microgrid system 100 can provide electricity to loads 104 that have a transient load profile that may not be met by certain conventional power generation systems, that may be geographically or otherwise isolated from a macrogrid, or in other applications where power from the macrogrid is not feasible or desirable. Further, the microgrid system 100 can provide electricity to loads 104 that may require more power than a single power source can provide.

As illustrated, the microgrid system 100 includes a common bus 102 that receives power from one or more power sources and outputs or distributes the power to the loads 104. In the depicted example, the common bus 102 can receive power from one or more generators 110 and distribute this power to one or more loads 104. In some embodiments, the generators can utilize an engine as the prime mover to operate the alternator to generate power. In some applications, the engine can be a turbine engine. In some applications, the engine can be a reciprocating engine. Advantageously, generators 110 that utilize reciprocating engines may provide improved transient response and may be more compact and cost-effective compared to other power generation equipment. In some embodiments, the generators 110 can be fueled by natural gas. Optionally, the generators 110 can be fueled by hydrogen, diesel, and/or other combustible gases. Embodiments of generators are described in U.S. application Ser. No. 17/575,194, titled "Mobile hybrid microgrid", filed Jan. 13, 2022.

In the depicted example, the voltage of the generators 110 is increased or stepped up via generator transformers 112. For example, the generator transformers 112 can increase the voltage from the generators 150 from 13.8 kV to 34.5 kV or any other voltage suitable for the load 104. In some embodiments, the generators 110 directly output electricity at a voltage that is suitable for distribution via the common bus 102. In the depicted example, the generators can also be isolated with one or more breakers 140. For example, the breakers 140 can protect the microgrid 100 in the event of an overload or short circuit. The breakers 140 can also isolate a generators 110 from the microgrid 100 in the event maintenance needs to be performed on the generators 110. In some embodiments, the common bus 102 and/or the breakers 140 can be disposed within a switchgear or switchgear trailer 103. Examples or embodiments of switchgear trailers are described in U.S. application Ser. No. 17/385,441 filed Jul. 26, 2021, now U.S. Pat. No. 12,261,417, both of which are incorporated by reference herein.

In some embodiments, the generators 110 can be stationary or mobile. For example, in some applications generators 110 can be transported and/or stored on trailers, facilitating the movement and replacement of power sources as needed. Further, additional generators or other power sources can be added as load 104 demands increase.

Figure 3B:
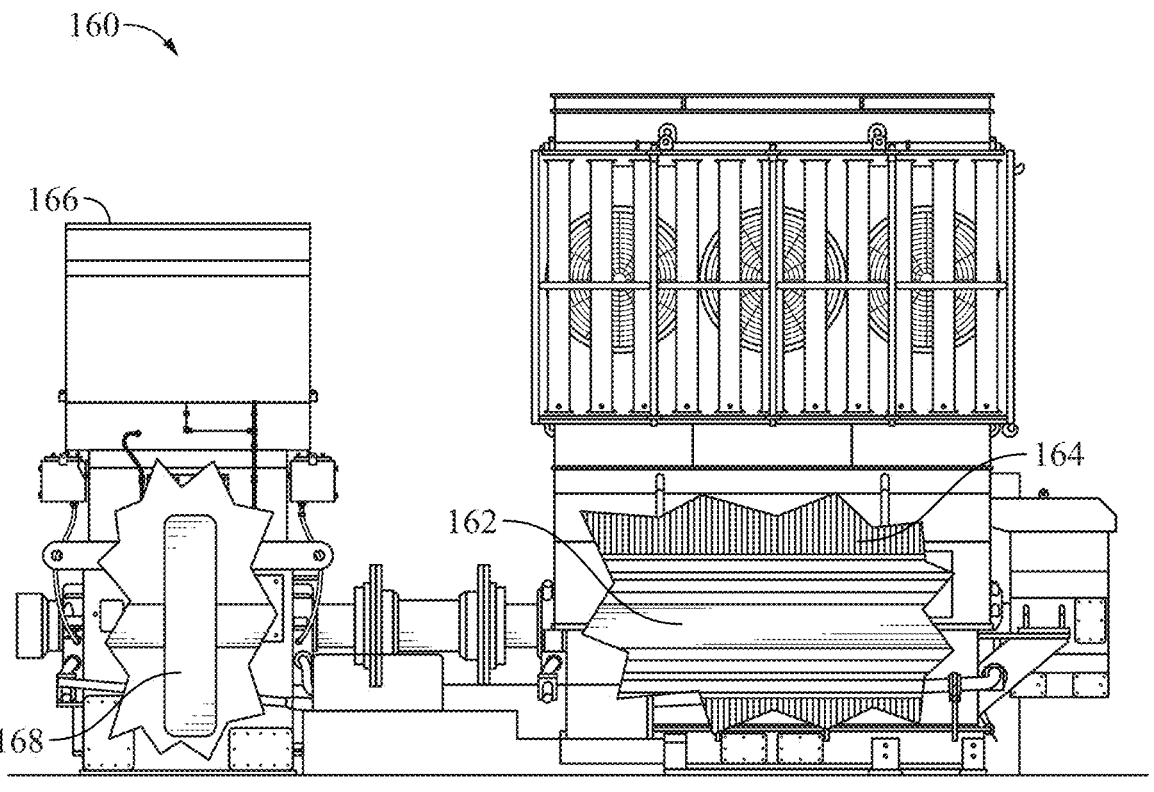
FIG. 3B is an exemplary embodiment of a synchronous condenser, in accordance with embodiments of the present disclosure.

FIG. 3B is an exemplary embodiment of a synchronous condenser 160, in accordance with embodiments of the present disclosure. With reference to FIGS. 3A and 3B, in the illustrated embodiment, the microgrid system 100 can utilize one or more DER devices, such as one or more synchronous condensers 160 electrically connected to the common bus 102 to stabilize frequency deviation during rapid transient demand from load 104. In the depicted example, the synchronous condenser 160 includes a rotor 162 and a stator 164. In contrast to a generator, the synchronous condenser 160 does not utilize a prime mover to drive the rotor 162. During operation, the rotor 162 of the synchronous condenser 160 is rotated relative to the stator 164 by the electricity generated by the generator 110. As described above, the rotational speed RPM of the rotor 162 of the synchronous condenser 160 is related to the frequency f of the electricity generated by the generators 110 and the number of poles np of the synchronous condenser 160:

$$f = RPM \cdot \frac{n_p}{120} = \frac{60}{2\pi} \cdot \omega \cdot \frac{n_p}{120} = \frac{n_p}{4\pi} \cdot \omega$$

If the synchronous condenser 160 has the same number of poles as the generators 110 (e.g. 4 poles), the synchronous condenser 160 will have the same rotational speed and angular velocity as the generator 110.

In the depicted example, the rotor 162 of the synchronous condenser 160 adds an additional rotational moment of inertia to the microgrid 100. During operation, the rotor 162 of the synchronous condenser 160 stores rotational energy (kinetic energy) that can be deployed as electrical energy until the mechanical power of the generators 110 can be increased and a frequency decay can be arrested. In some embodiments, the synchronous condenser 160 can include a flywheel assembly 166 with a rotating flywheel 168 coupled to the rotor 162 to further increase the rotational inertia of the synchronous condenser 160. For example, a synchronous condenser 160 can have a rotational moment of inertia ranging between 10,000 to 50,000 $kgm^2$, between 20,000 to 40,000 $kgm^2$, or between 20,000 to 30,000 $kgm^2$. In some applications, the synchronous condenser 160 can have a rotational moment of inertia of approximately 27,200 $kgm^2$. For a given angular velocity (e.g. 188.7 Rad/s or 60 Hz for a 4 pole device) a synchronous condenser 160 with a rotational moment of inertia of approximately 27,200 $kgm^2$ can store approximately 480 MW seconds of power. In contrast, a generator 110 may have a rotational moment of inertia ranging between 200 to 500 $kgm^2$, between 200 to 400 $kgm^2$, or between 200 to 300 $kgm^2$. In some embodiments, a generator 110 may have a rotational moment of inertia of 1600 $kgm^2$. For a given angular velocity (e.g. 188.7 Rad/s or 60 Hz for a 4 pole device) a generator 110 with a rotational moment of inertia of approximately 352 $kgm^2$ can store approximately 6 MW seconds of power. Therefore, in some embodiments, a synchronous condenser 160 can provide a significantly greater rotational moment of inertia and significantly greater rotational power storage (in excess of 50 times more). As described above, the rotational moment of inertia of the synchronous condenser 160 can combine with the rotational moment of inertia of the generator 110 for a total system moment of inertia (and rotational power storage) that can resist frequency deviations during transient load or load blocks.

In some embodiments, the voltage of the synchronous condenser 160 is increased or stepped up via transformers 130. For example, the transformers 130 can increase the voltage from the synchronous condenser 160 to any voltage suitable for the load 104. In some embodiments, the synchronous condenser 160 may directly output electricity at a voltage that is suitable for distribution via the common bus 102. In the depicted example, the synchronous condenser 160 can also be isolated with a breaker 140. The breaker 140 can isolate a synchronous condenser 160 from the microgrid 100 in the event maintenance needs to be performed on the synchronous condenser 160.

Figure 4:
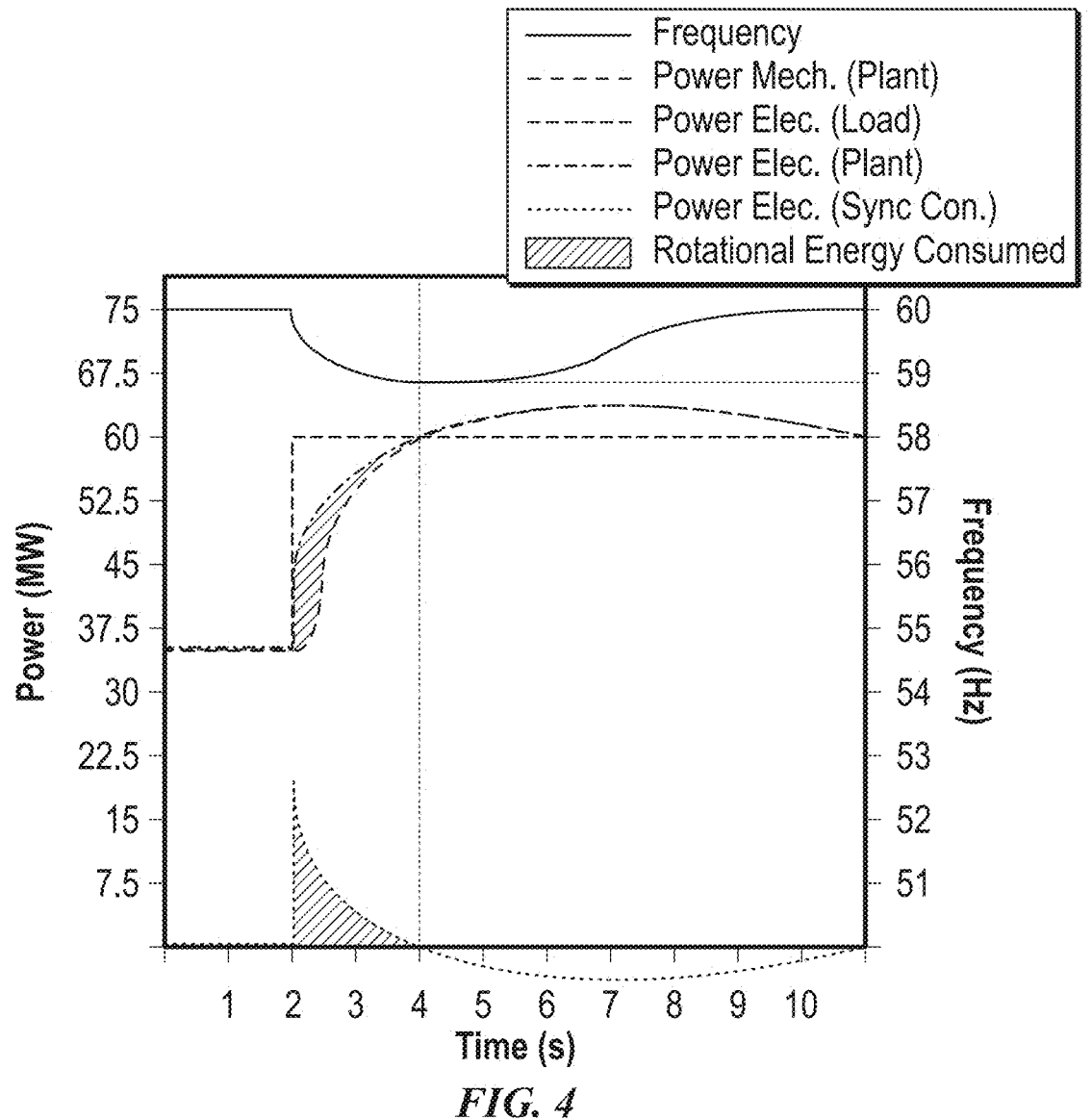
FIG. 4 is a graph depicting the frequency responses of a microgrid with a synchronous condenser, in accordance with embodiments of the present disclosure.

Referring to FIG. 4, the frequency response of a microgrid system utilizing a generator with the use of a synchronous condenser is shown. Similar to the graph shown in FIG. 2, the Power Elec (Load) line shows the power requirement of a load. In this example, the load initially requires about 35 MW of power, but then requires a sudden increase to 60 MW of power. Similar to the frequency response of a microgrid system without a synchronous condenser, the mechanical power (plant) lags behind the initial change in demand from the load, causing rotational energy of the microgrid to be consumed. Further, similar to certain conventional microgrids, the generators of the microgrid can take approximately 2 seconds to arrest the frequency decay in response to the increase in load (load block). The transient period may vary depending on the generators used.

In contrast to certain conventional microgrid systems, as shown in FIG. 4 and discussed above, the synchronous condenser introduces a significantly greater rotational moment of inertia than microgrids that only include generators. Therefore, assuming the same 2 second transient period to arrest the frequency decay, the increased rotational moment of inertia J, reduces the frequency deviation of the system, as illustrated in FIG. 4.

As illustrated in FIG. 4, the relatively high rotational moment of inertia J of the synchronous condenser allows the microgrid to resist frequency deviation from the target of 60 Hz. In response to the load block, the frequency is reduced from 60 Hz to 58.8 Hz (a 2% reduction) for a short period of time, reducing the magnitude of the frequency deviation by approximately 7-8% in comparison to the conventional microgrid system of FIG. 2.

In some applications, as a result of the relatively high rotational moment of inertia J of the synchronous condenser, the response of the control systems for the generators 110 may need to be tuned or adjusted for the transient response of the microgrid. For example, more energy (e.g. more fuel) may need to be introduced for a given change in rotational speed for a system with a higher rotational moment of inertia J compared to a system with a lower rotational moment of inertia (e.g. a system without a synchronous condenser).

As depicted in the table below, the use of a synchronous condenser can maintain the frequency of the electrical system within a desired tolerance across a wide variety of operating conditions and load blocks. For example, in a system with a load capacity (node size) of 75 MW, a total generator moment of inertia of 9856 kgm² (174.2 MW seconds of rotational energy storage) and a synchronous condenser with a rotational moment of inertia of 27,200 kgm² (480 MW seconds of rotational energy storage) the chart shows that the microgrid can meet the demand of various load blocks (up to 100% of the node size) while maintaining a desired customer frequency tolerance. As shown, with the synchronous condenser, the system can meet the demand of a 30% load block while maintaining a 2% frequency tolerance, an 85% load block while maintaining a 5% frequency tolerance, and a load block up to 100% while maintaining a 10% frequency tolerance.

| Required Additional Energy (in MWs) | | | | |
|---|---|---|---|---|
| Max. Load Block (as percent of Node Size) | Energy Consumed (MWs) | Customer Frequency Tolerance | | |
| | | ±2% | ±5% | ±10% |
| 5% | 3.75 | 0.00 | 0.00 | 0.00 |
| 10% | 7.5 | 13.32 | 0.00 | 0.00 |
| 15% | 11.25 | 107.07 | 0.00 | 0.00 |
| 20% | 15 | 200.82 | 0.00 | 0.00 |
| 25% | 18.75 | 294.57 | 0.00 | 0.00 |
| 30% | 22.5 | 388.32 | 50.82 | 0.00 |
| 35% | 26.25 | 482.07 | 88.32 | 0.00 |
| 40% | 30 | 575.82 | 125.82 | 0.00 |
| 45% | 33.75 | 669.57 | 163.32 | 3.46 |
| 50% | 37.5 | 763.32 | 200.82 | 23.19 |
| 55% | 41.25 | 857.07 | 238.32 | 42.93 |
| 60% | 45 | 950.82 | 275.82 | 62.67 |
| 65% | 48.75 | 1044.57 | 313.32 | 82.40 |
| 70% | 52.5 | 1138.32 | 350.82 | 102.14 |
| 75% | 56.25 | 1232.07 | 388.32 | 121.88 |
| 80% | 60 | 1325.82 | 425.82 | 141.61 |
| 85% | 63.75 | 1419.57 | 463.32 | 161.35 |
| 90% | 67.5 | 1513.32 | 500.82 | 181.09 |
| 95% | 71.25 | 1607.07 | 538.32 | 200.82 |
| 100% | 75 | 1700.82 | 575.82 | 220.56 |

Advantageously, the synchronous condenser can deploy energy to the load faster than supplemental battery power. Synchronous condensers instantly provide energy due to its reliance on momentum and stored rotational energy. Further, a synchronous condenser can provide more frequency stability than by adding a generator to introduce additional inertia into the system. In some applications, additional generators may increase emissions and may increase the overall footprint of the system. Advantageously, a synchronous condenser may allow for an increase of the rotational moment of inertia beyond the practical limit of generators.

In some embodiments, it may be advantageous to control the excitation of the synchronous condenser to control the storage and deployment of rotational energy. In some applications, by controlling the excitation of the synchronous condenser, the power factor of the system can be adjusted or otherwise corrected, increasing the longevity of components of the system. Further, a synchronous condenser may maintain voltage stability in a system.

Figure 5A:
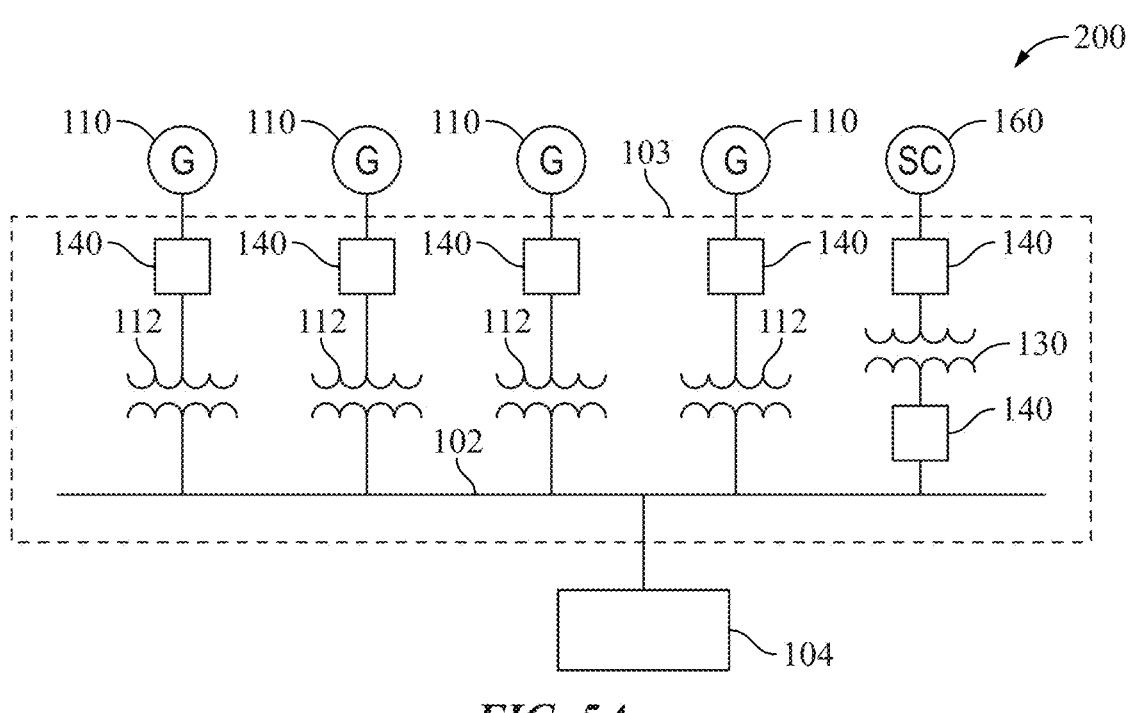
FIG. 5A is an electrical line diagram of a plurality of power generation systems with a synchronous condenser, in accordance with embodiments of the present disclosure.

In some embodiments, a microgrid system with a synchronous condenser can include multiple generators. FIG. 5A is an electrical line diagram of a microgrid system 200, in accordance with embodiments of the present disclosure. As illustrated, the microgrid system 200 includes a plurality of generators 110 to allow the microgrid 200 to provide power to the load 104. Features of microgrid system 200 that are similar to features of microgrid system 100 are identified with common reference numerals.

As discussed above, the generators 110 each have a generator rotational moment of inertia. The generator rotational moment of inertia of each generator 110 contributes to the overall system rotational moment of inertia and rotational energy storage.

While four generators 110 are shown in FIG. 5, the microgrid system 200 can include any sufficient number of generators to allow the power produced by the generators to meet or exceed the maximum anticipated load 104 by the microgrid system 200. Further, in some embodiments, the microgrid system 200 can include a sufficient number of generators to allow the power produced by a subset of generators to meet or exceed the maximum anticipated load 104 by the microgrid system 200, allowing for at least one redundant generator. In some applications, a microgrid system 200 can include twenty generators in a high-power configuration (e.g. data center operations). In some applications, the microgrid system 200 can include ten generators in a readily mobile configures (e.g. an electrically powered hydraulic fracturing operation). In some applications, each generator provides 2.5 MW of power.

Figure 5B:
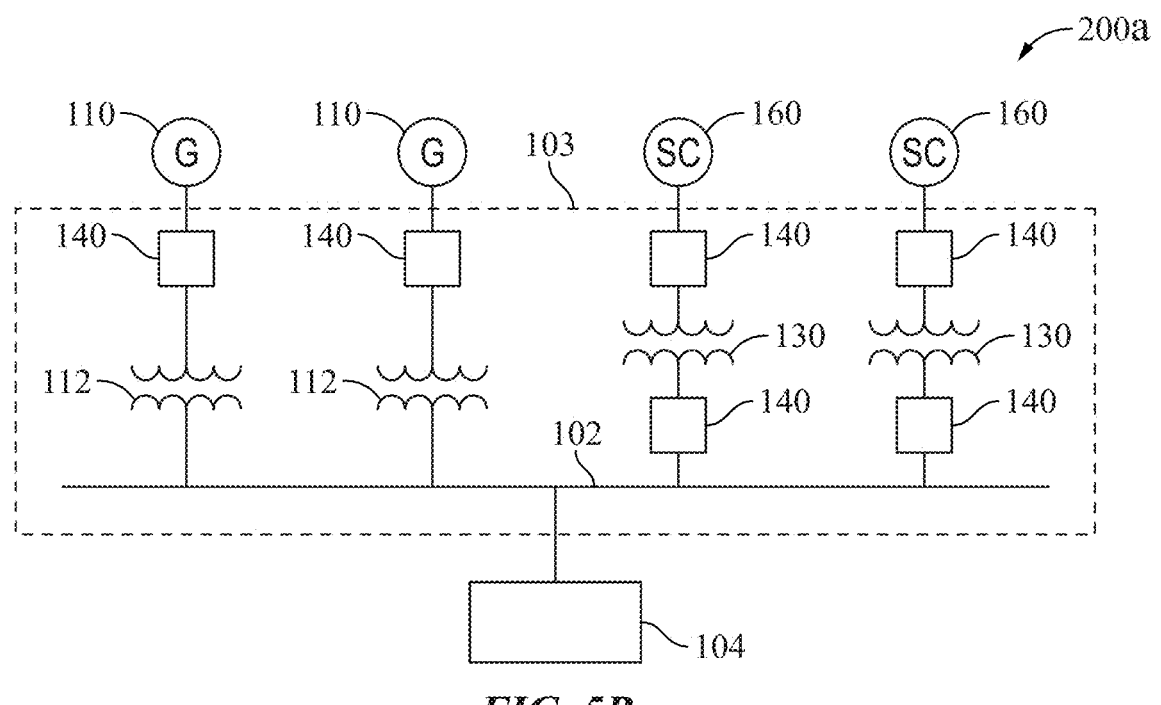
FIG. 5B is an electrical line diagram of a plurality of power generation systems with a plurality of synchronous condensers, in accordance with embodiments of the present disclosure.

FIG. 5B is an electrical line diagram of a microgrid system 200a, in accordance with embodiments of the present disclosure. With reference to FIG. 5B, in the illustrated embodiment, the microgrid system 200a can include multiple synchronous condensers 160 on the common bus 102 to stabilize frequency deviation during rapid transient demand from load 104. In the depicted example, the synchronous condensers 160 can be directly electrically connected to the common bus 102.

Figure 5C:
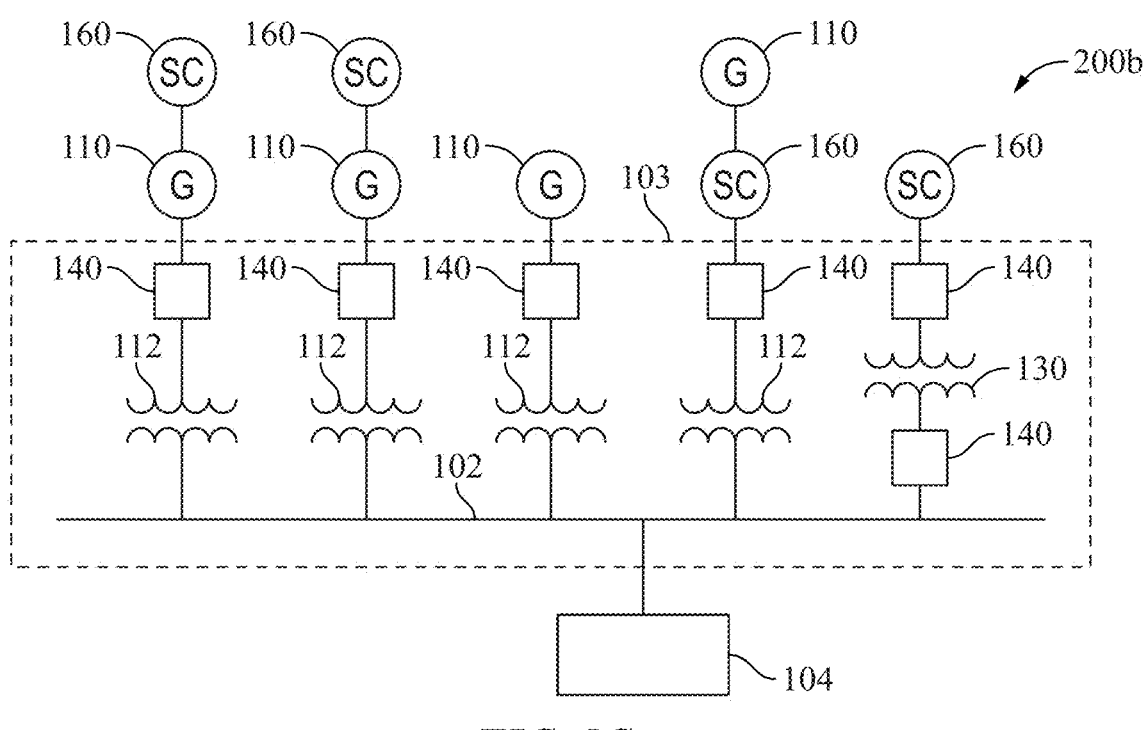
FIG. 5C is an electrical line diagram of a plurality of power generation systems with a plurality of synchronous condensers, in accordance with embodiments of the present disclosure.

FIG. 5C is an electrical line diagram of a microgrid system 200b, in accordance with embodiments of the present disclosure. With reference to FIG. 5C, in the illustrated embodiment, the microgrid system 200c can include multiple synchronous condensers 160 electrically connected to one or more respective generators 110. In some embodiments, a synchronous condenser 160 can be directly electrically connected to a respective generator 110, which is in turn connected to the common bus 102. Further, as illustrated, in some embodiments, a generator 110 can be connected to a synchronous condenser 160, which is in turn connected to the common bus 102. As illustrated, not every generator 110 is required to be directly connected to a synchronous condenser 160. Further, not every synchronous condenser 160 is required to be directly connected to a generator 110.

While a synchronous condenser 160 may be directly connected to a respective generator 110, the rotational energy (kinetic energy) stored by a respective synchronous condenser 160 can be deployed to stabilize frequency deviation across the entire microgrid system 200b. Optionally, one or more synchronous condensers 160 can also be directly connected to the common bus 102.

For embodiments that include multiple synchronous condensers 160 (e.g. microgrid systems 200b, 200c of FIGS. 5B and 5C), multiple synchronous condensers 160 can stabilize the frequency deviation during rapid transient demand from load 104. As described herein, the rotor of each of the synchronous condensers 160 can collectively add additional rotational moment of inertia to the total system moment of inertia of the microgrid 200b, 200c. Similarly, the rotors of each of the synchronous condensers 160 can contribute to the total system rotational power storage that can be deployed as electrical energy until the mechanical power of the generators 110 can be increased and a frequency decay can be arrested.

Further, embodiments of the present disclosure can incorporate a bank of ultracapacitors (or supercapacitors) connected to the common bus to address the transient and harmonic effects of transient load profiles. Advantageously, the use of ultracapacitors can dampen the electrical system of the microgrid, provide voltage support during rapid transient load requirements, and positively affect the performance and longevity of the power generation equipment.

Figure 6:
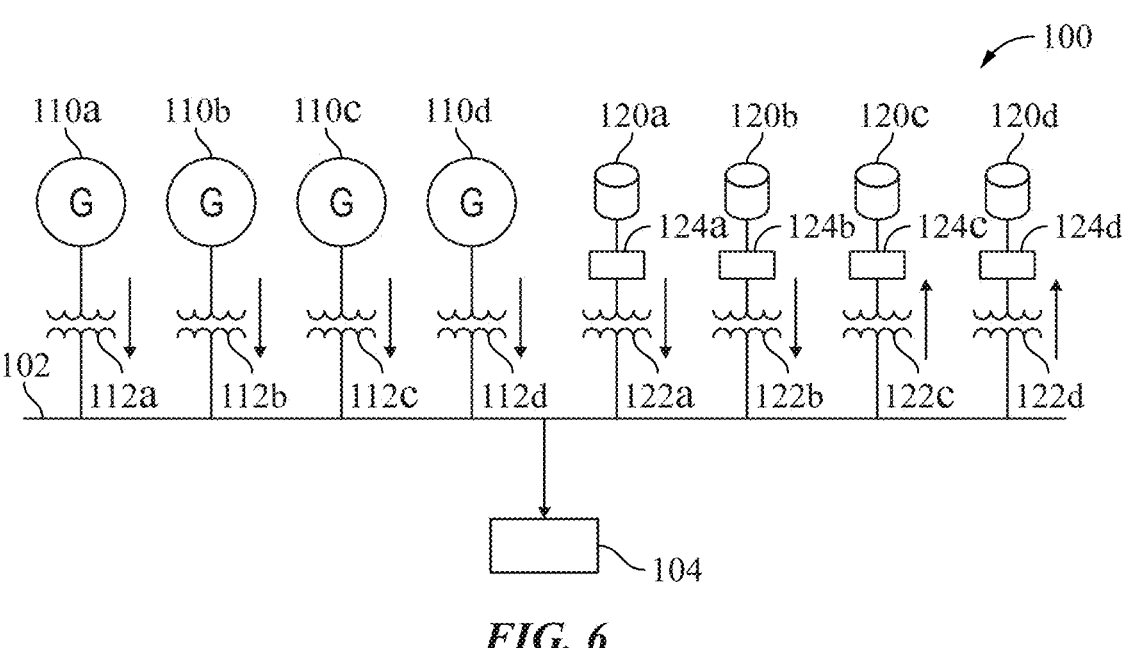
FIG. 6 is an electrical line diagram of a microgrid system, in accordance with embodiments of the present disclosure.

FIG. 6 is an electrical line diagram of a microgrid system 300, in accordance with embodiments of the present disclosure. As illustrated, the microgrid system 300 includes ultracapacitors 120a-120d. In the depicted example, the common bus 102 can receive power from one or more generators 110a-110d and/or one or more ultracapacitors 120a-120d. The common bus 102 can combine power received from one or more generators 110a-110d and/or one or more ultracapacitors 120a-120d and distribute power to one or more loads 104. Advantageously, the power distributed to the loads 104 can be greater than the power provided by any single generator 110a-110d. Further, the power demand of the loads 104 may be met by the one or more ultracapacitors 120a-120d faster than the generators 110a-110d are able to respond. In some embodiments, the common bus 102 and/or the breakers 140 can be disposed within a switchgear or switchgear trailer 103. Examples or embodiments of switchgear trailers are described in U.S. application Ser. No. 17/385,441 filed Jul. 26, 2021, now U.S. Pat. No. 12,261,417, both of which are incorporated by reference herein. Optionally, the microgrid system 300 includes a controller to monitor and adjust operation parameters of the microgrid system 300.

In the depicted example, microgrid system 300 includes features that are similar to the features of microgrid systems 100 and 200. Features of microgrid system 300 that are similar to features of microgrid system 100 and 200 are identified with common reference numerals.

In the depicted example, the microgrid system 300 can utilize a bank of high-capacity capacitors, also referred to as supercapacitors or ultracapacitors 120a-120d to deploy power to dampen the electrical operation of the microgrid system 300 and provide voltage support during rapid transient demand from load 104. In some embodiments, the ultracapacitors 120a-120d utilize electrostatic double-layer capacitance and electrochemical pseudocapacitance to provide energy storage. Advantageously, ultracapacitors 120a-120d can provide higher capacitance and energy storage density than solid-state capacitors, as well as faster and more robust charging and discharging compared to batteries. Further, the ultracapacitors 120a-120d can source and sink power quickly to respond to rapid changes that increase and/or decrease load as single events or repeating events. For example, ultracapacitors 120a-120d can respond to the leading or falling edge of transient events, such as load changes from 0% to 100% and back to 0% over intervals spanning milliseconds, including load profiles that are clustered with periods of steady state demand (in conjunction with generators 110a-110d).

In the depicted example, DC power from the ultracapacitors 120a-120d is converted into AC power that is suitable for distribution via the common bus 102. As illustrated, the DC voltage from the ultracapacitors 120a-120d is inverted to AC power via inverters 124a-124d.

In the depicted example, the voltage of the inverters 124a-124d is increased or stepped-up via ultracapacitor transformers 122a-122d, respectively. For example, the ultracapacitor transformers 122a-122d can increase the voltage from the inverters 124a-124d from 480V to 34.5 kV or any other voltage suitable for the load 104. In some embodiments, the inverters 124a-124d directly output electricity at a voltage that is suitable for distribution via the common bus 102.

While four ultracapacitors 120a-120d are shown in FIG. 6, the microgrid system 300 can include any sufficient number of ultracapacitors to meet the transient load needs of load 104. In some embodiments, each ultracapacitor 120a-120d is capable of delivering 10 MW of power into the common bus 102 and to the load 104.

In the depicted example, the ultracapacitors 120a-120d can be charged by power provided by the generators 110a-110d. As illustrated, power from the generators 110a-110d via the common bus 102 is stepped-down via the ultracapacitor transformers 122a-122d and provided to each respective ultracapacitor 120a-120d. For example, the ult-racapacitor transformers 122a-122d can decrease the common bus voltage of 34.5 kV to 480V or any other voltage suitable for use with the inverters 124a-124d.

In the depicted example, the AC power from the common bus 102 is converted into DC power that is suitable for charging the ultracapacitors 120a-120d. As illustrated, the AC voltage from the common bus 102 is converted to DC voltage via the inverters 124a-124d. In some applications, the inverters 124a-124d are bi-directional inverters.

Figure 7:
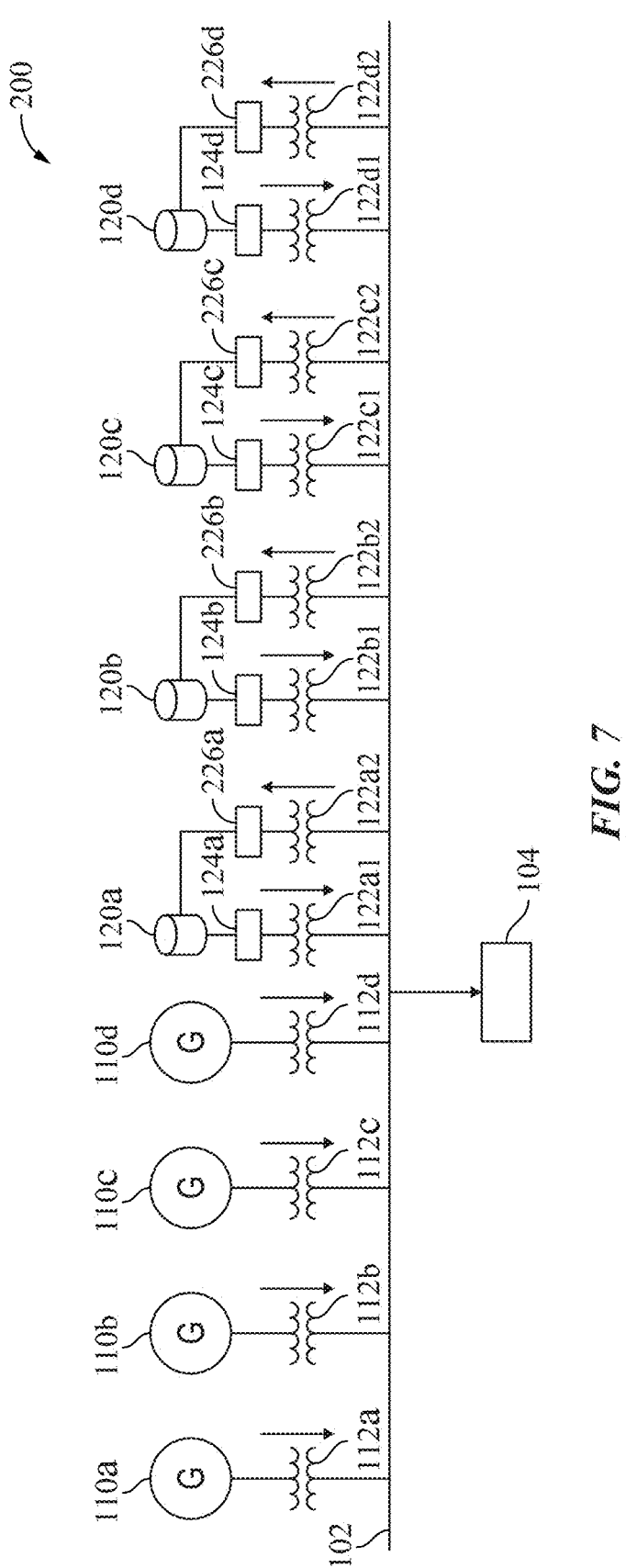
FIG. 7 is an electrical line diagram of a microgrid system, in accordance with embodiments of the present disclosure.

FIG. 7 is an electrical line diagram of a microgrid system 400, in accordance with embodiments of the present disclosure. As illustrated, the microgrid system 400 includes separate inverters 124a-124d and chargers 226a-226d to allow the microgrid 400 to provide power to the load 104 during transient demand and charge the ultracapacitors 120a-120d. In the depicted example, microgrid system 400 includes features that are similar to the features of microgrid system 300. Features of microgrid system 400 that are similar to features of microgrid system 300 are identified with common reference numerals.

As illustrated, DC power from the ultracapacitors 120a-120d is converted into AC power that is suitable for distribution via the common bus 102. In some applications, the DC voltage from the ultracapacitors 120a-120d is inverted to AC power via standalone inverters 124a-124d.

In the depicted example, the voltage of the inverters 124a-124d is increased or stepped-up via ultracapacitor transformers 122a1-122dl, respectively. For example, the ultracapacitor transformers 122a1-122dl can increase the voltage from the inverters 124a-124d from 480V to 34.5 kV or any other voltage suitable for the load 104. In some embodiments, the inverters 124a-124d directly output electricity at a voltage that is suitable for distribution via the common bus 102.

As shown in FIG. 7, the ultracapacitors 120a-120d can be charged by power provided by the generators 110a-110d. In some embodiments, power from the generators 110a-110d via the common bus 102 is stepped-down via the ultracapacitor transformers 122a2-122d2 and provided to each respective ultracapacitor 120a-120d. For example, the ult-racapacitor transformers 122a2-122d2 can decrease the common bus voltage of 34.5 kV to 480V or any other voltage suitable for use with the chargers 226a-226d.

In some applications, the AC power from the common bus 102 is converted into DC power that is suitable for charging the ultracapacitors 120a-120d. In the depicted example, the AC voltage from the common bus 102 is converted to DC voltage via the stand-alone chargers 226a-226d.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted.

Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

The invention claimed is:

1. A method for providing electric power comprising the following steps:
   receiving a first power demand from a load at a microgrid;
   distributing power to the load from the microgrid, comprising:
      generating electricity via a generator, wherein the generator is electrically coupled to a common bus and the generator maintains a generator rotational energy at a system rotational frequency;
      operating a synchronous condenser, wherein the synchronous condenser:
         comprises a rotor and a stator;
         is electrically coupled to the common bus; and
         operates at the system rotational frequency in response to the electricity generated by the generator; and
         storing a synchronous condenser rotational energy at the system rotational frequency via the synchronous condenser;
   receiving a second power demand from the load, wherein the second power demand is greater than the first power demand; and
   deploying a combination of the generator rotational energy and the synchronous condenser rotational energy to distribute power to the load from the microgrid to resist a deviation of the system frequency in response to the second power demand.

2. The method of claim 1, further comprising adjusting an excitation of the synchronous condenser to adjust the synchronous condenser rotational energy.

3. The method of claim 1, wherein the generator comprises a turbine generator.

4. The method of claim 1, wherein the generator comprises a reciprocating engine.

5. The method of claim 1, further comprising storing excess electrical energy of the generator via the synchronous condenser as the synchronous condenser rotational energy.

6. The method of claim 1, further comprising:
   storing a flywheel rotational energy via a flywheel assembly, wherein the flywheel assembly comprises a flywheel coupled to the rotor of the synchronous condenser and the flywheel rotates in response to a rotation of the rotor.

7. The method of claim 6, further comprising:

deploying a combination of the generator rotational energy, the synchronous condenser rotational energy, and the flywheel rotational energy to distribute power to the load from the microgrid to resist a deviation of the system frequency in response to the second power demand.

8. The method of claim 1, wherein the generator is electrically connected to the common bus through the synchronous condenser.

9. The method of claim 1, further comprising generating electricity via a plurality of generators, wherein each generator of the plurality of generators is electrically connected to the common bus, each generator of the plurality of generators has a respective generator rotational inertia, and a system rotational inertia includes the respective generator rotational inertia of each of the plurality of generators.

10. The method of claim 9, wherein the synchronous condenser is electrically connected to the common bus through one generator of the plurality of generators.

11. The method of claim 9, wherein one generator of the plurality of generators is electrically connected to the common bus through the synchronous condenser.

12. The method of claim 9, further comprising operating a plurality of synchronous condensers, wherein each of the plurality of synchronous condensers is electrically connected to the common bus through each of a set of the plurality of generators.

13. The method of claim 9, further comprising operating a plurality of synchronous condensers, wherein each of a set of the plurality of generators is electrically connected to the common bus through each of the plurality of synchronous condensers.

14. The method of claim 9, wherein a prime mover of each generator of the plurality of generators comprises a reciprocating engine.

15. The method of claim 9, wherein each generator of the plurality of generators comprises a turbine generator.

16. The method of claim 9, wherein a system rotational energy includes the respective generator rotational energy of each of the plurality of generators and the synchronous condenser rotational energy.

17. The method of claim 1, further comprising operating a plurality of synchronous condensers, wherein each of the plurality of synchronous condensers is electrically connected to the common bus.

18. The method of claim 17, wherein each of the plurality of synchronous condensers is directly electrically connected to the common bus.

19. The method of claim 1, wherein the synchronous condenser rotational energy is greater than the generator rotational energy.

20. The method of claim 19, wherein the synchronous condenser rotational energy is at least 50 times greater than the generational rotational energy.

21. The method of claim 19, wherein the synchronous condenser rotational moment of inertia is at least 50 times greater than the generator rotational moment of inertia.

22. The method of claim 19, wherein the synchronous condenser moment of inertia is between 10,000 and 50,000 $kgm^2$.

23. The method of claim 1, wherein the combination of the generator rotational energy and the synchronous condenser rotational energy resists the deviation of the system frequency within a desired system frequency tolerance, wherein the desired system frequency tolerance is less than 10%.

24. The method of claim 23, wherein the desired system frequency tolerance is less than 5%.

25. The method of claim 23, wherein the desired system frequency tolerance is less than 2%.

26. The method of claim 1, wherein the combination of the generator rotational energy and the synchronous condenser rotational energy are capable of generating a total system power output, and the difference between the second power demand and the first power demand is at least 30% of the total system power output.

27. The method of claim 26, wherein the difference between the second power demand and the first power demand is at least 85% of the total system power output.

28. The method of claim 26, wherein the difference between the second power demand and the first power demand is at least 100% of the total system power output.

* * * * *